United States Patent
Park

(10) Patent No.: US 10,803,348 B2
(45) Date of Patent: Oct. 13, 2020

(54) HYBRID-BASED IMAGE CLUSTERING METHOD AND SERVER FOR OPERATING THE SAME

(71) Applicant: DATAKING. INC, Seoul (KR)

(72) Inventor: Sun Kyou Park, Seoul (KR)

(73) Assignee: DATAKING. INC, Seoul (KR)

( * ) Notice: Subject to any disclaimer, the term of this patent is extended or adjusted under 35 U.S.C. 154(b) by 190 days.

(21) Appl. No.: 16/058,874

(22) Filed: Aug. 8, 2018

(65) Prior Publication Data

US 2018/0349732 A1     Dec. 6, 2018

Related U.S. Application Data

(63) Continuation of application No. PCT/KR2017/001476, filed on Feb. 10, 2017.

(30) Foreign Application Priority Data

Feb. 12, 2016   (KR) .................. 10-2016-0016295

(51) Int. Cl.
*G06N 20/00* (2019.01)
*G06F 16/78* (2019.01)
(Continued)

(52) U.S. Cl.
CPC .......... *G06K 9/622* (2013.01); *G06F 16/7867* (2019.01); *G06K 9/00744* (2013.01);
(Continued)

(58) Field of Classification Search
CPC .......... G06K 9/00711; G06K 9/00718; G06K 9/00744; G06K 9/00751; G06K 9/00758;
(Continued)

(56) References Cited

U.S. PATENT DOCUMENTS

| 10,592,750 B1* | 3/2020 | Yavagal ................. G11B 27/02 |
| 2013/0282747 A1* | 10/2013 | Cheng .................... G06F 16/73 |
| | | 707/758 |

(Continued)

FOREIGN PATENT DOCUMENTS

| KR | 10-1191172 B1 | 10/2012 |
| KR | 10-2014-0035541 A | 3/2014 |
| KR | 10-2015-0028589 A | 3/2015 |

OTHER PUBLICATIONS

International Search Report issued in PCT/KR2017/001476; dated May 19, 2017.

*Primary Examiner* — Dwayne D Bost
*Assistant Examiner* — Stephen M Brinich
(74) *Attorney, Agent, or Firm* — Studebaker & Brackett PC

(57) ABSTRACT

A hybrid-based image clustering method and a server for operating the same are provided. The method includes extracting a video object from each of a plurality of videos, calculating information about a similar key point between a predetermined reference target object and the extracted video object, clustering at least some of the plurality of videos into a first video group associated with the reference target object based on the information about the similar key point, and clustering at least some of the videos included in the first video group into a second video group based on at least one of video capture location information and place tag information of the videos included in the first video group.

6 Claims, 9 Drawing Sheets

(51) Int. Cl.
*G06K 9/46* (2006.01)
*G06N 20/10* (2019.01)
*G06K 9/62* (2006.01)
*G06K 9/00* (2006.01)

(52) U.S. Cl.
CPC ......... *G06K 9/4604* (2013.01); *G06K 9/6269* (2013.01); *G06N 20/00* (2019.01); *G06N 20/10* (2019.01); *G06K 2209/27* (2013.01)

(58) Field of Classification Search
CPC ...... G06K 9/6218; G06K 9/46; G06K 9/4604; G06K 9/4609; G06K 2209/27; G06K 2209/25; G06F 16/7867; G06F 16/78; G06F 16/787; G06F 16/783; G06N 20/00; G06N 20/10
USPC .......................... 382/155–160, 165, 224–227
See application file for complete search history.

(56) References Cited

U.S. PATENT DOCUMENTS

| | | | |
|---|---|---|---|
| 2014/0136566 A1* | 5/2014 | Kim | G06F 16/532 707/769 |
| 2016/0012594 A1* | 1/2016 | Romanik | G06T 7/337 382/203 |
| 2016/0300122 A1* | 10/2016 | Bao | G06K 9/6211 |
| 2017/0061231 A1* | 3/2017 | Higa | G06T 7/00 |
| 2017/0206670 A1* | 7/2017 | Miyasa | G06T 7/11 |

* cited by examiner

FIG. 7

| Classification | Location coordinates (latitude, longitude) | Tag | Image |
|---|---|---|---|
| Video object 1 | 37.579617 126.977041 | Admission Korean Table d'hôtel Gyeongbokgung Palace |  |
| Video object 2 | 37.55997 126.975304 | Market Sungnyemun Namdaemun | 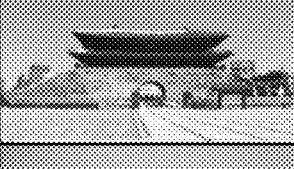 |
| Video object 3 | 37.2807977 127.0080516 | Temporar palace Cultural assets Suwon Hwaseong Fortress | 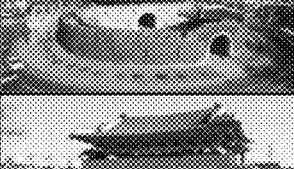 |
| Video object 4 | 35.1868013 128.0772122 | Kim Si-min Chokseongnu Pavilion Jinjuseong Fortress | 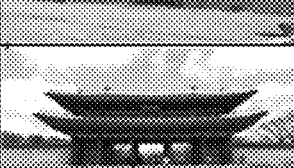 |
| Video object 5 | 37.5794309 126.9910426 | Backyard Moonlight tours Changdeokgung Palace |  |
| Video object 6 | 37.5658091 126.9729521 | Doldam-gil Famous restaurant Deoksugung Palace |  |

FIG. 9

| Classification | Key point extraction time | Size (height x width) | The number of key points |
|---|---|---|---|
| Video object 1 | 1.66 sec | 480×640 | 42 |
| Video object 2 | 3.18 sec | 480×640 | 48 |
| Video object 3 | 4.90 sec | 480×640 | 48 |
| Video object 4 | 4.27 sec | 480×640 | 22 |
| Video object 5 | 4.96 sec | 480×640 | 20 |
| Video object 6 | 4.67 sec | 480×640 | 48 |

HYBRID-BASED IMAGE CLUSTERING METHOD AND SERVER FOR OPERATING THE SAME

CROSS-REFERENCE TO RELATED APPLICATIONS

The present application is a continuation of International Patent Application No. PCT/KR2017/001476, filed on Feb. 10, 2017, which is based upon and claims the benefit of priority to Korean Patent Application No. 10-2016-0016295, filed on Feb. 12, 2016. The disclosures of the above-listed applications are hereby incorporated by reference herein in their entirety.

BACKGROUND

Embodiments of the inventive concept described herein relate to a hybrid-based image clustering method, and more particularly, relate to technologies of clustering a plurality of videos by extracting a key point from a video and fusing location information with tag information.

In general, Big Data may refer to a large amount of structured or unstructured data sets which exceed conventional collection, storage, analysis, and management competency and may be classified as structured data or unstructured data. In this case, the unstructured data may be classified as a text, a video, an audio, an image, or the like.

In case of text data, there have been attempts to perform a variety of research, for example, natural language processing (NLP), such as text mining, or social network analysis. In case of audio data, artificial intelligence technology for speech recognition has been actively developed. In contrast, research on an analysis of video big data which has a consecutive stream form of images is very rudimentary due to a burden of a technical processing speed of video classification and a database (DB).

Recently, an over the top (OTT) service of extracting related information and object data from videos and Internet multimedia content and creating a new business based on the extracted information and data is provided. The OTT service refers to a manner of providing video, television, and other broadcast services over the Internet. In addition, there has been an explosion of demand for video content provided to an OTT and video on demand (VOD) platform due to the provision of a new type of digital media player (e.g., Apple TV™, Google™, or the like).

Furthermore, there has been an abrupt change in a communication means in a social network or the like from a form of a text or photo to a form of transmitting a message using a video such as an abbreviated video.

When various types of videos are shared in a video content platform, a user should use a specific tagged online keyword to search for video information. However, when videos are not correctly classified or when it is difficult to classify videos, it may be difficult for the user to classify or search for videos according to desired search criteria.

Furthermore, when a video is from an unknown source or when tag information of the video is not correctly assigned, there is a high possibility that the video will be omitted in a classification or search process. Thus, it may be difficult to classify videos according to systematic, accurate criteria (e.g., a place).

When clustering videos by only a specific method, it may be difficult for the user to classify videos based on the exact intention of the user. Particularly, since a method of recognizing images has high complexity, it may be difficult to implement the method in real time and results may vary according to light conditions and the like.

SUMMARY

Embodiments of the inventive concept provide technologies about a method for more clearly clustering a plurality of videos by extracting a key point and fusing location information with tag information.

According to an aspect of an embodiment, a server may include a video object extracting unit configured to extract a video object from each of a plurality of videos, a reference target providing unit configured to learn a reference target object, and a clustering management unit configured to calculate information about a similar key point between the learned reference target object and the extracted video object, cluster at least some of the plurality of videos into a first video group associated with the reference target object based on the information about the similar key point, and cluster at least some of the videos included in the first video group into a second video group based on at least one of video capture location information and place tag information of the videos included in the first video group.

The clustering management unit may be configured to calculate each cluster variable for each of the plurality of videos based on at least one of the video capture location information and the place tag information and cluster the at least some of the videos included in the first video group into the second video group by first considering any one of the video capture location information and the place tag information based on the calculated cluster variable.

The clustering management unit may be configured to calculate first reliability according to video capture location information associated with each of the plurality of videos, calculate second reliability according to place tag information of each of the plurality of videos, and calculate the cluster variable based on the first reliability and the second reliability. The first reliability may be higher than the second reliability.

The clustering management unit may be configured to, when there are a plurality of place tag information of each of the plurality of videos, verify whether the place tag information is place tag information recorded by a photographer who captures the plurality of videos or place tag information recorded by a third party and calculate the second reliability by applying a weight depending on the verified result. The clustering management unit may be configured to, when the place tag information is the place tag information recorded by the photographer, calculate the second reliability by applying a higher weight than that when the place tag information is the place tag information recorded by the third party.

The video object extracting unit may be configured to extract an object exposed during the most time among a plurality of objects exposed on each of the plurality of videos as the vide object.

According to another aspect of an embodiment, a hybrid-based image clustering method may include extracting a video object from each of a plurality of videos, calculating information about a similar key point between a predetermined reference target object and the extracted video object clustering at least some of the plurality of videos into a first video group associated with the reference target object based on the information about the similar key point, and clustering at least some of the videos included in the first video group into a second video group based on at least one of video capture location information and place tag information of the videos included in the first video group.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 7 to 9 are drawings generally illustrating a process of clustering videos according to various embodiments of the inventive concept.

DETAILED DESCRIPTION

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

The "video" used in the specification may refer to a moving image or a still image and may be referred to as the video itself or video information (e.g., a file) in which the video is converted into content.

Furthermore, the "clustering" used in the specification may be collectively referred to as an operation of classifying data (e.g., videos) into some groups based on a similar key point, location information, and tag information.

Furthermore, the "object" used in the specification may refer to at least a partial region exposed depending on video playback on a frame or image of the video. Such an object may include various types of objects, for example, a person, a place, a building, or a background.

The "video object" used in the specification may refer to an object, a key point of which is extracted to classify key point extraction videos. Such a video object may be configured with, for example, a specific frame, image, or thumbnail of a video.

Hereinafter, a description will be given of a hybrid-based image clustering method and a server 200 for performing the same with reference to the accompanying drawings.

Figure 1:
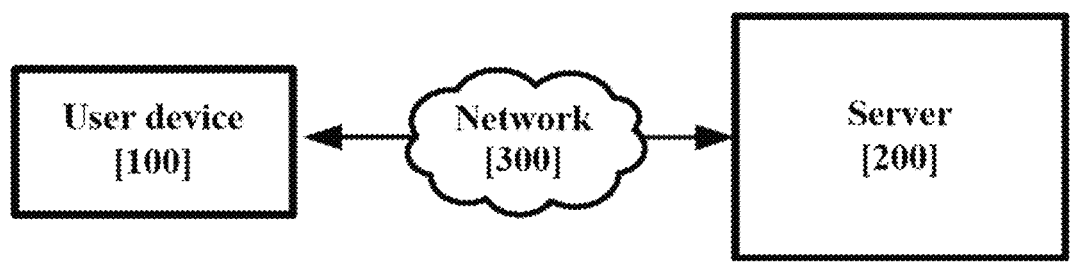
FIG. 1 is a block diagram illustrating a configuration of a hybrid-based image clustering system according to various embodiments of the inventive concept.

FIG. 1 is a block diagram illustrating a configuration of a hybrid-based image clustering system 10 according to various embodiments of the inventive concept.

The image clustering system 10 may include a user device 100, a server 200, and a network 300. Such an image clustering system 10 may perform a function of clustering a plurality of videos based on a key point, location information, and tag information.

The user device 100 may be each of various types of electronic devices capable of accessing the server 200 over the network 300 and verifying videos clustered by the server 200. Such a user device 100 may be any one of, for example, a smartphone, a tablet, a mobile phone, a desktop personal computer (PC), a laptop PC, a netbook computer, a workstation, a personal digital assistant (PDA), a portable multimedia player (PMP), an MPEG-1 audio layer 3 (MP3) player, or a wearable device.

The server 200 may be an electronic device or a program for performing a function of performing hybrid-based clustering of a plurality of videos and serving an intensive function associated with the clustering operation. A description will be given of a detailed configuration of such a server 200 with reference to FIG. 2.

The network 300 may be a telecommunications network. The telecommunications network may include at least one of a computer network, the Internet, an Internet of things (IoT), or a telephone network. According to various embodiments, a protocol (e.g., a transport layer protocol, a data link layer protocol, or a physical layer protocol) for communication between the user device 100, the server 200, and the network 300 may be supported by at least one of an application, an application programming interface, middleware, a kernel, or a communication module.

Figure 2:
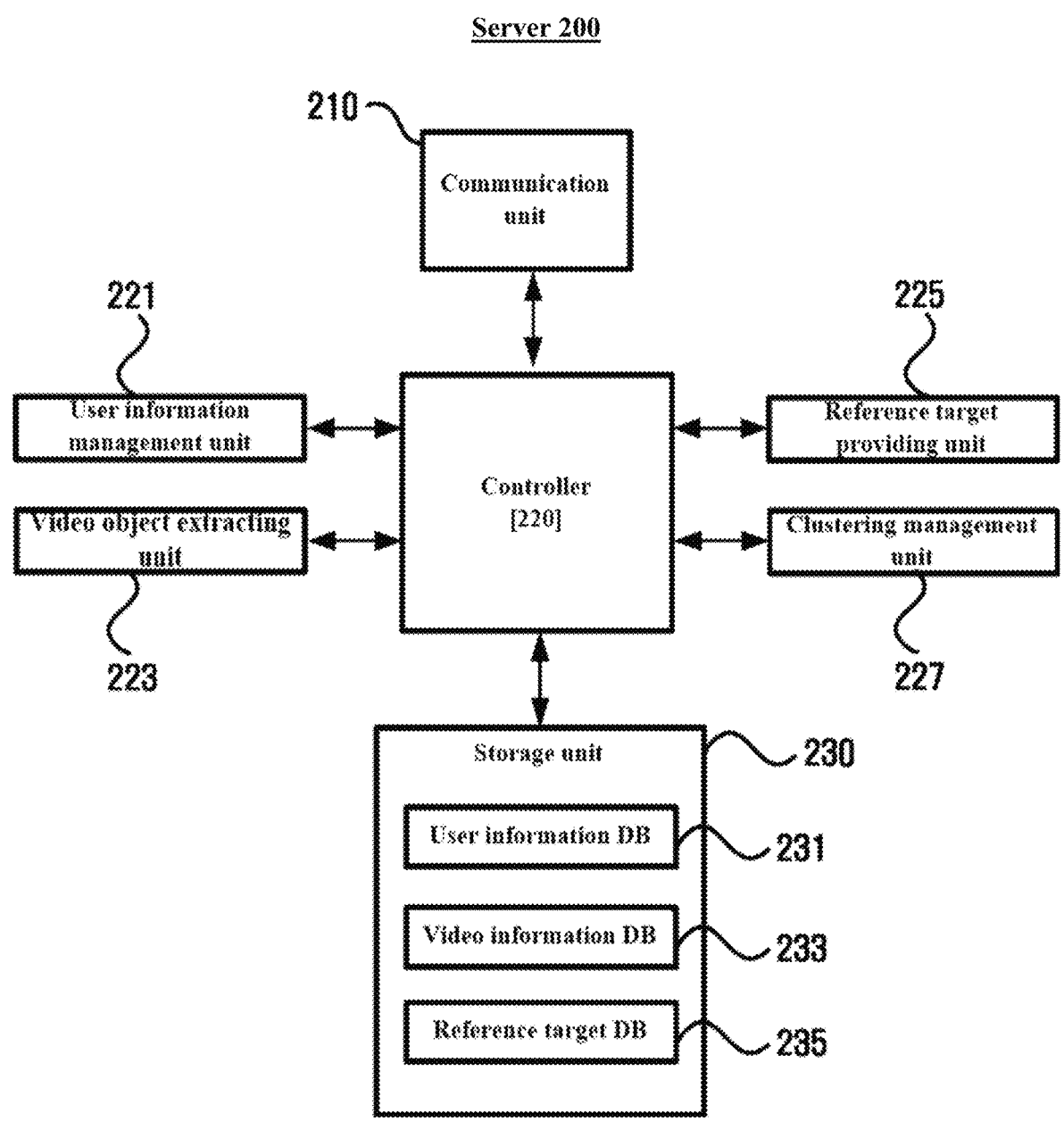
FIG. 2 is a block diagram illustrating a configuration of a server according to various embodiments of the inventive concept.

FIG. 2 is a block diagram illustrating a configuration of a server 200 according to various embodiments of the inventive concept.

According to various embodiments, the server 200 may include a communication unit 210, a controller 220, a user information management unit 221, a video object extracting unit 223, a reference target providing unit 225, a clustering management unit 227, and a storage unit 230. As an unlimited embodiment, the server 200 may fail to include at least some of components of FIG. 1 and may further include additional components.

The communication unit 210 may connect communication between a user device 100 of FIG. 1 and the server 200. For example, the communication unit 210 may be connected to the network 300 through wireless communication or wired communication to provide an interface screen of clustered videos to the user device 100. Furthermore, the communication unit 210 may receive a signal input in connection with an operation of clustering videos from the user device 100 and may provide the received signal to the controller 220. Although not illustrated, such a communication unit 210 may be directly connected with the network 300.

The controller 220 may control an overall operation, such as power supply control of the server 200, and signal flow between components in the server 200 and may perform a data processing function of processing data. The controller 220 may include at least one processor. The at least one processor may include one or more of a central processing unit (CPU), an application processor (AP), or a communication processor (CP).

The user information management unit 221 may perform an authentication process necessary for the user device 100 to access the server 200. For example, the user information management unit 221 may provide a subscription and log-in screen to the user device 100 such that a user receives a video clustering service. The user information management unit 221 may receive user information input to the subscription and log-in screen and may store the received user information in a user information DB 231.

The video object extracting unit 223 may extract a video object from each of a plurality of videos.

The video object extracting unit 223 may receive a video from the outside over the network 300 or may load a video stored in the storage unit 230. For example, the video object extracting unit 223 may collect various video data on a video content platform such as, but not limited to, YouTub™. The video object extracting unit 223 may extract a video object from the collected video. Such a video object may be configured with, for example, a thumbnail, an image, or a frame.

According to various embodiments, the video object extracting unit 223 may verify an object exposed during the most time among a plurality of objects exposed when the collected video is played back and may extract the verified object as a video object.

Furthermore, the video object extracting unit 223 may zoom out or in on the extracted video object to a predetermined size and may perform a preprocessing procedure of converting the video object into a grayscale video. For example, the video object extracting unit 223 may zoom out on the extracted video object to a video of 147*173 pixels and may convert the zoomed-out video into a grayscale video. The video object extracting unit 223 may deliver the collected video, the extracted video object, or the preprocessed video object to the clustering management unit 227 or the storage unit 230.

The reference target providing unit 225 may collect a reference target object. Such a reference target object may be an object capable of being set by the reference target providing unit 225 to compare the video object extracted by the video object extracting unit 223 with an image. The reference target providing unit 225 may load the reference target object from the storage unit 230 or may receive the reference target object over the network 300. The loaded or received reference target object may be delivered to the clustering management unit 227 or the storage unit 230.

The clustering management unit 227 may extract a key point of each of the reference target object and the video object and may calculate information about a similar key point between the reference target object and the video object. Herein, the information about the similar key point may be information (e.g., a specific numerical value or the specific number of key points) for determining whether the key point extracted from the video object is matched to some degree with respect to the key point extracted from the reference target object. Furthermore, the information about the similar key point may refer to the number of key points extracted from the video object by information learned through the reference target object and may further include a key point extraction time.

The clustering management unit 227 may extract a key point of each of the reference target object and the video object using various types of image feature classifiers. As an unlimited example, the clustering management unit 227 may extract a feature vector of each of the reference target object and the video object using, but not limited to, a speed up robust features (SURF) image feature classifier.

The clustering management unit 227 may calculate information about a similar key point of the video object (e.g., the number of key points extracted from the video object) based on a key point learned through the reference target object. In some embodiments, the clustering management unit 227 may cluster at least one video associated with the reference target object among a plurality of videos into a first video group based on the calculated similar key point information. Such a first video group may be, but is not limited to, a group of videos in which the similar key point information of the video object meets a predetermined condition (e.g., a specific number or more of key points) among the plurality of collected videos. The predetermined condition may be set in various manners according to a manager or a system policy of the server 200.

Furthermore, the clustering management unit 227 may verify location information (e.g., image capture location information) and tag information (e.g., place tag information) of the videos included in the first video group and may cluster at least one of the videos included in the first video group into a second video group based on the verified information. Further, the clustering management unit 227 may calculate a cluster variable based on the location information and the tag information and may cluster the at least one of the videos included in the first video group into the second video group using the calculated cluster variable. A description will be given of a detailed operation of such clustering.

Meanwhile, metadata capable of being collected from a video may include a title, a type, a size, resolution, rotation, a producer, a model, or a focal length of the video, information about coordinates by a global positioning system (GPS) signal (e.g., video capture location information), or a tag, a video capture date, an image, or the like of the video. Herein, the size, the resolution, the producer, the model, or the focal length of the video or the information about the coordinates by the GPS signal may be automatically assigned by a physical device, and an image capture place or title information of the video, a title for a specific scene of the video, or the like may be a tag which is randomly input by a photographer. The server 200 according to various embodiments of the inventive concept may fuse (video capture) location information with place tag information among such metadata using the above-mentioned manner of the image feature classifier (e.g., a key point extraction technique) to perform a clustering operation and may further use a detailed classification algorithm.

The user information management unit 221, the video object extracting unit 223, the reference target providing unit 225, and the clustering management unit 227 may be functional components separately illustrated to distinguish at least some functions of the controller 220 from general functions of the controller 220. In FIG. 2, an embodiment is exemplified as the user information management unit 221, the video object extracting unit 223, the reference target providing unit 225, and the clustering management unit 227 are independent of the controller 220. However, various embodiments of the inventive concept are not limited thereto. For example, the user information management unit 221, the video object extracting unit 223, the reference target providing unit 225, the clustering management unit 227, and the controller 220 may be configured as one module.

In addition, the functions of the user information management unit 221, the video object extracting unit 223, the reference target providing unit 225, the clustering management unit 227, and the controller 220 may be implemented in the form of a routine, instructions, or a program stored in the storage unit 230 (e.g., a memory). In other words, operations performed by respective components of the user information management unit 221, the video object extracting unit 223, the reference target providing unit 225, the clustering management unit 227, and the controller 220 may be implemented as the routine, the instructions, or the program stored in the storage unit 230 is performed under control of a processor.

Furthermore, the routine, the instructions, or the program configured to perform the operations may be stored in a computer-readable storage medium. Such a storage medium may include all types of storage media which store a program and data readable by a computer system. For example, the storage medium may include a read only memory (ROM), a random access memory (RAM), a compact disk (CD), a digital video disk (DVD)-ROM, a magnetic tape, a floppy disc, an optical data storage device, a flash memory, or the like. In addition, such a storage medium may be distributed to a computer system connected to a network, and a computer-readable code may be stored and executed on a distributed basis in the storage medium.

The storage unit 230 may store data which is received or generated from the controller 220, the server 200, or other components of an image clustering system 10 of FIG. 1. The storage unit 230 may include, for example, a memory, a cache, a buffer, or the like and may be configured with software, firmware, hardware, or at least two or more combinations thereof.

According to various embodiments, the storage unit 230 may include the user information DB 231, a video information DB 233, and a reference target DB 235.

The user information DB 231 may store personal information (e.g., an identifier (ID), a password, an address, a mobile phone number, or the like) of a user, which is received in an authentication process, such as a subscription or log-in process, from the user device 100.

The video information DB 233 may store a video or a video object provided from each of the video object extracting unit 223 and the reference target providing unit 225. The reference target DB 235 may store a reference target object provided from the reference target providing unit 225.

Furthermore, the storage unit 230 may store a first video group, a second video group, a cluster variable, reliability, or weight information, which is extracted, generated, or calculated according to a clustering operation.

In FIG. 2, an embodiment is exemplified as the user information DB 231, the video information DB 233, and the reference target DB 235 are independent of each other on the storage unit 230. However, embodiments are not limited thereto. For example, the user information DB 231, the video information DB 233, and the reference target DB 235 may be configured as one.

Figure 3:
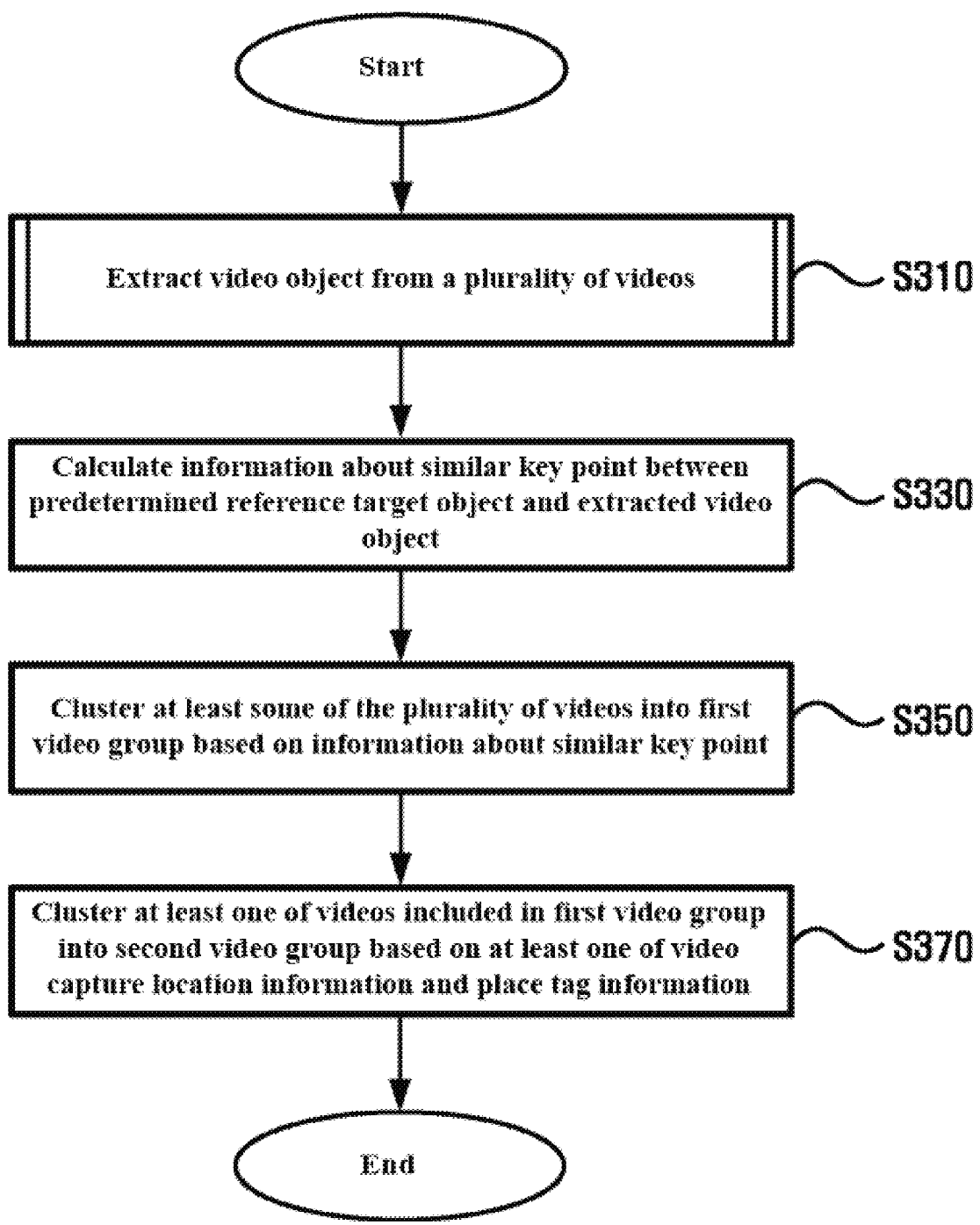
FIG. 3 is a flowchart illustrating a hybrid-based image clustering operation in a server according to various embodiments of the inventive concept.

FIG. 3 is a flowchart illustrating a hybrid-based image clustering operation in a server according to various embodiments of the inventive concept.

According to various embodiments, in operation S310, a server 200 of FIG. 2 may extract a video object from a plurality of videos. For example, the server 200 may extract a thumbnail image or the like included in each video as a video object compared to classify the video.

In operation S330, the server 200 may calculate information about a similar key point between a predetermined reference target object and the extracted video object.

In detail, the server 200 may select a reference target object which is a clustering classification criterion and may perform machine learning of the selected reference target object. The server 200 may perform the machine learning for each video object. Such machine learning may be performed by extracting, but not limited to, a feature vector (e.g., a key point) of each of a reference target object and a video object using, for example, an SURF image feature classifier.

In operation S350, the server 200 may cluster at least some of the plurality of videos into a first video group based on the information about the similar key point. For example, the server 200 may calculate the number of key points, which are identical between the reference target object and the video object, as the information about the similar key point and may cluster at least one of the plurality of videos into the first video group based on whether a condition where a predetermined number or more of key points are extracted is met.

In operation S370, the server 200 may cluster at least one of videos included in the first video group into a second video group based on at least one of video capture location information and place tag information. In this case, the server 200 may cluster at least some of the videos included in the first video group into the second video group by first considering any one of the video capture location information and the place tag information based on the cluster variable.

In FIG. 3, an embodiment is exemplified as the server 200 performs the clustering into the second video group in the first video group based on the video capture location information and the place tag information after performing the clustering into the first video group based on the information about the similar key point. However, embodiments are not limited thereto. As an unlimited example, the server 200 may first cluster at least some of a plurality of videos into a first video group based on video capture location information and place tag information and may then cluster at least one of videos included in the first video group into a second video group using the same manner of the image feature classifier (e.g., the same key point extraction technique) as operations S310 to S350.

Figure 4:
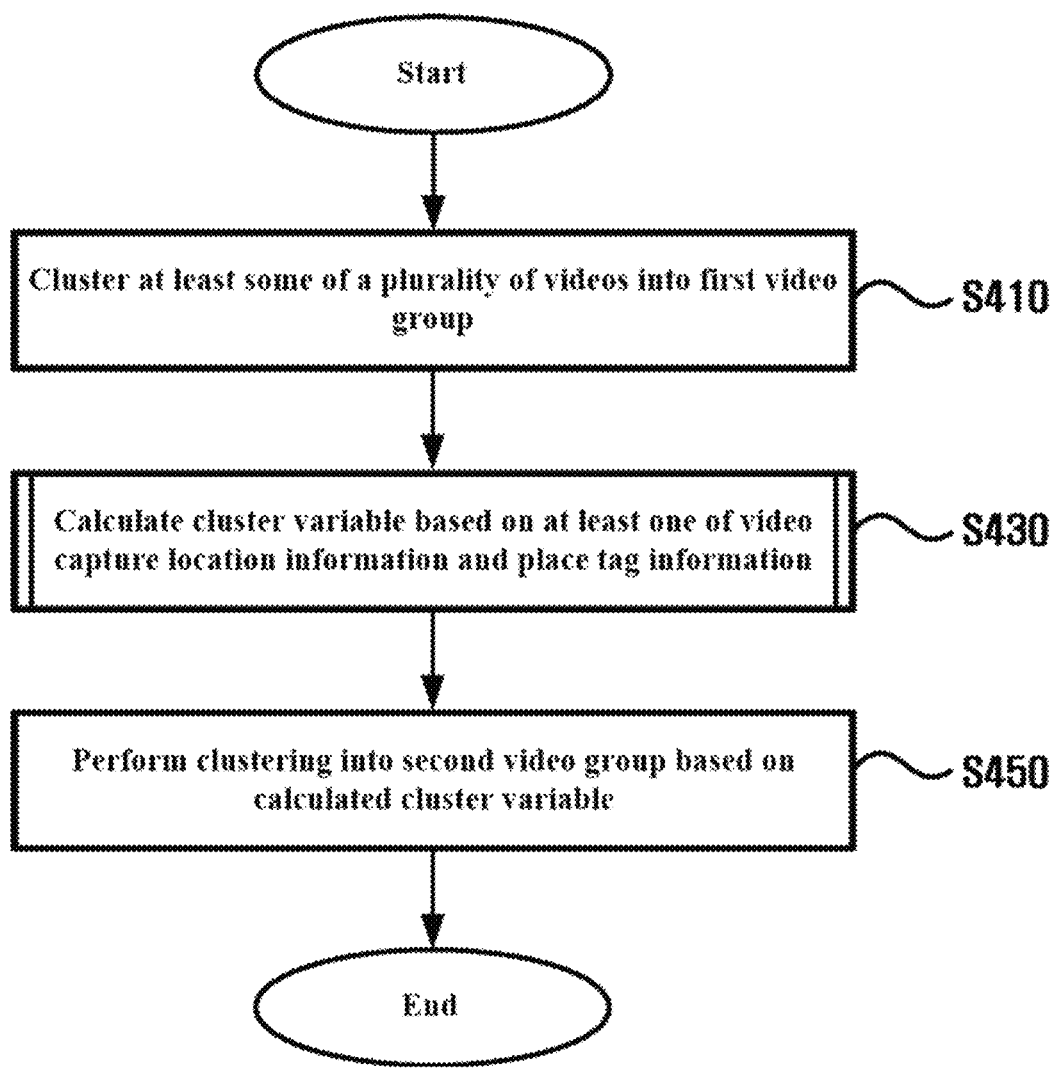
FIG. 4 is a flowchart illustrating an operation of clustering videos at a server based on a cluster variable according to various embodiments of the inventive concept.
Figure 5:
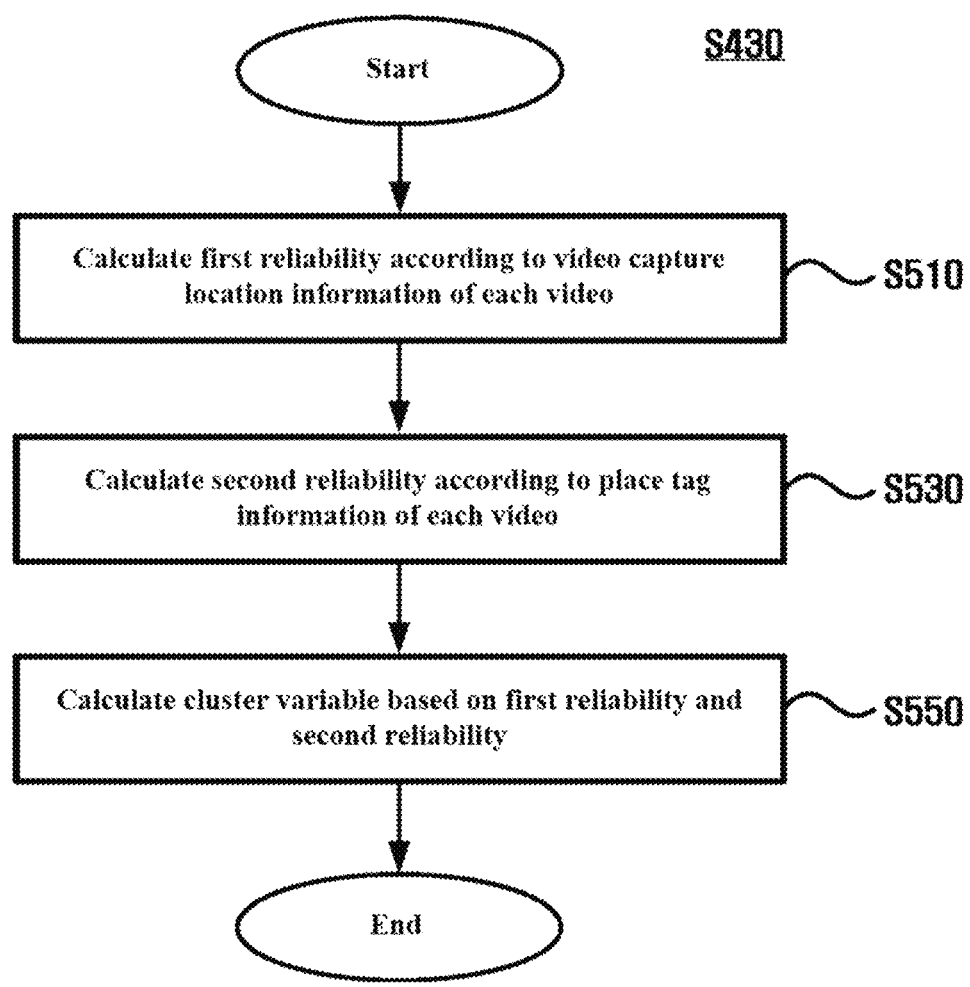
FIG. 5 is a flowchart illustrating a detailed operation of calculating a cluster variable at a server according to various embodiments of the inventive concept.

FIG. 4 is a flowchart illustrating an operation of clustering videos at a server 200 based on a cluster variable according to various embodiments of the inventive concept. FIG. 5 is a flowchart illustrating a detailed operation of calculating a cluster variable at a server according to various embodiments of the inventive concept. Respective operations of FIG. 5 may be an example of operation S430 of FIG. 4.

According to various embodiments, in operation S410, the server 200 may cluster at least some of a plurality of videos into a first video group using a feature extraction technique. Since a detailed operation of operation S410 is described with reference to FIG. 3, a detailed description for the detailed operation of operation S410 will be omitted.

In operation S430, the server 200 may calculate a cluster variable based on at least one of video capture location information and place tag information. In operation S450, the server 200 may perform clustering into a second video group based on the calculated cluster variable. As an unlimited example, when a plurality of information included in videos of the first video group contradict each other, the cluster variable may be a parameter used to first select any information to cluster the videos into the second video group.

In detail, in operation S510, the server 200 may calculate first reliability according to video capture location information of each of the plurality of videos. In operation S530, the server 200 may calculate second reliability according to place tag information of each of the plurality of videos. In operation S550, the server 200 may calculate the cluster variable based on the first reliability and the second reliability.

For example, it is assumed that a reference target object to be classified is "Namdaemun", that video location information of a specific video (e.g., video A) included in a first video group has 37.55997 north latitude and 126.975304 east longitude which are a location of the "Namdaemun", and that place tag information tagged to video A is "Dongdaemun". In the assumption, a manager of the server 200 wants to classify videos corresponding to the "Namdaemun" into a second video group. However, while the video capture information of video A indicates the location of the "Namdaemun", since the place tag information indicates the "Dongdaemun", an error may occur upon clustering.

As described above, the video capture location information may be metadata input through a physical device, and the place tag information may be any metadata input by a photographer or a third party who performs tagging (collaborative tagging) to a video. Since the photographer or the third party is able to misunderstands or fail to recognize information such as a place or building included in video A, video capture location information (e.g., GPS information) recognized as a mechanical numerical value may be more accurate. Thus, the server 200 may calculate reliability (e.g., first reliability) according to video capture location information to be higher than reliability (e.g., second reliability) according to place tag information.

Thus, since there is video capture information for video A, the server 200 may calculate the reliability of +10 with respect to an item for the video capture location information. Since there is place tag information about video A, the server 200 may calculate the reliability of +2 with respect to an item for the place tag information. The server 200 may determine whether the video capture location information and the place tag information indicate the same place. When the video capture location information and the place tag information indicate different places, the server 200 may calculate a cluster variable of an "item (+8) for video capture location information" indicating that an item for video capture location information is higher than an item for place tag information by +8. The server 200 may verify the "Namdaemun" which is an item for video capture location information of video A and may cluster video A into a second video group corresponding to the "Namdaemun".

Furthermore, according to some embodiments, when there are a plurality of place tag information of a video, the server 200 may verify whether the place tag information is place tag information recorded by a photographer who captures the video or place tag information recorded by a third party.

For example, when two information such as "Namdaemun" and "Dongdaemun" are recorded as tag information (e.g., place tag information) recorded for a specific video (e.g., video B), the server 200 may analyze the tag information to determine whether each tag information is recorded by the photographer or the third party rather than the photographer. To this end, the server 200 may verify metadata recorded in video B to verify a log record of the tag information.

The server 200 may calculate second reliability by applying a weight depending on the verified result when calculating the second reliability according to place tag information. Relatively, it may be seen that tag information recorded by a photographer who directly capture a video of a specific place has higher reliability than tag information recorded by a third party who verifies only an uploaded video. Thus, when place tag information is place tag information recorded by the photographer, the server 200 may calculate the second reliability by applying higher weight than that when the place tag information is recorded by the third party.

According to additional embodiments, the server 200 may classify a feature vector (e.g., a key point) extracted from a video object using a location coordinate classifier such as a support vector machine (SVM) classifier with respect to a video capture place. In this case, an SVM of a sequential minimal optimization (SMO) technique widely used as the value of a quadratic programming problem may be used. The SVM may be one of fields of machine learning, may be a supervised learning model for pattern recognition and data analysis, and may be used mainly for classification and regression analysis. For example, when a set of data which belongs to any one of two categories is given, an SVM algorithm may generate a non-probabilistic binary linear classification model of determining whether new data belongs to any category based on the given data set. Thus, the server 200 may use video capture location information (e.g., GPS data), which is input concurrently with video capture, as a weight upon SVM classification. The server 200 may extract location information (e.g., GPS data) in degrees, minutes, or seconds, which is recorded in exchangeable image file format (EXIF) metadata of a video, to obtain such video capture location information.

The server 200 according to various embodiments of the inventive concept may derive a more reliable clustering result by considering location information and tag information in a selective, agglomerative, or prior manner depending on the predetermined algorithm.

Figure 6:
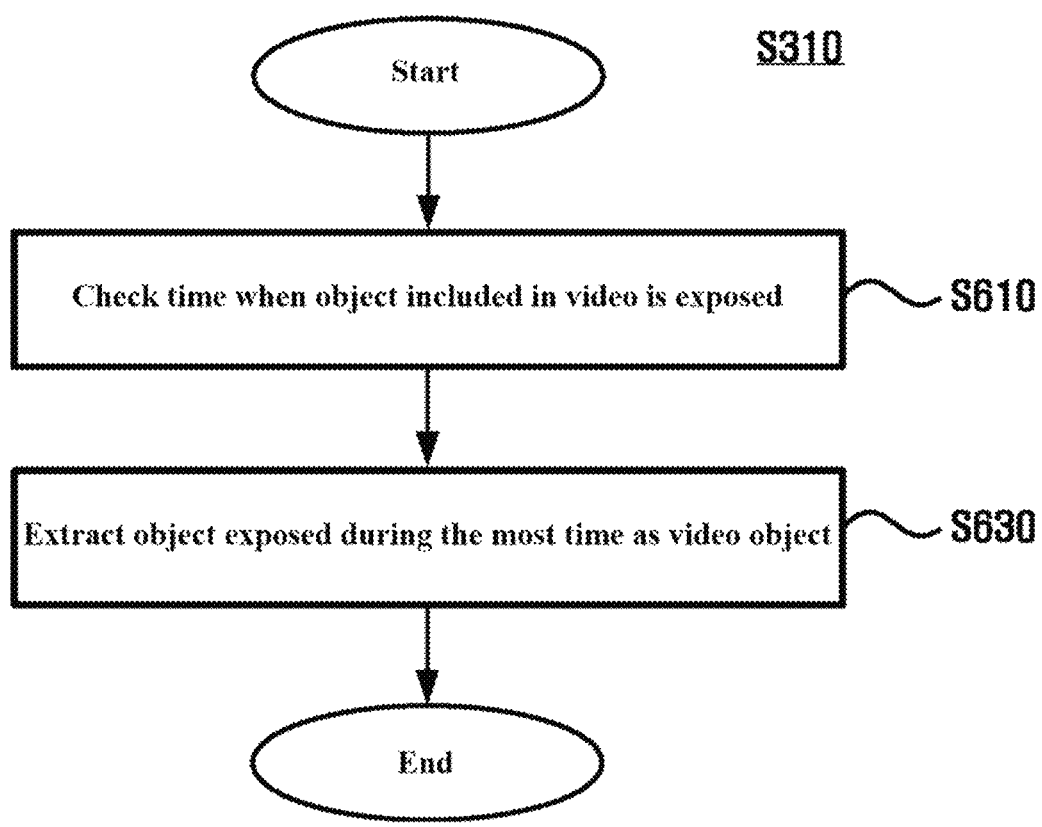
FIG. 6 is a flowchart illustrating an operation of extracting a video object at a server based on a time when the video object is exposed on a video according to various embodiments of the inventive concept.

FIG. 6 is a flowchart illustrating an operation of extracting a video object at a server 200 based on a time when the video object is exposed on a video according to various embodiments of the inventive concept. Respective operations of FIG. 6 may be an example of operation S310 of FIG. 3.

According to various embodiments, in operation S610, the server 200 may check a time when an object included in a video is exposed. In operation S620, the server 200 may extract an object exposed during the most time as a video object.

In detail, the server 200 may verify objects exposed while a specific video is played back and may check a time when each object is exposed. The server 200 may extract the object exposed during the most time as the video object (e.g., a thumbnail image) and may cluster the extracted video object. When there are a plurality of objects (e.g., places, buildings, or the like) included in a specific video, it may be verified whether any image is captured in priority on the specific video. By doing so, the specific video may be effectively clustered in a direction intended by all of a manager of the server 200, a photographer, and a searcher.

Figure 8:
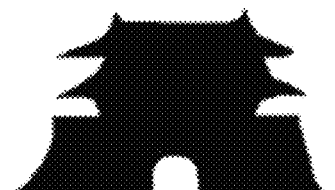

FIGS. 7 to 9 are drawings generally illustrating a process of clustering videos according to various embodiments of the inventive concept.

First of all, referring to FIG. 7, as experimental data according to various embodiments of the inventive concept, a total of 6 thumbnail images of a video for Korean structures (Gyeongbokgung Palace, Namdaemun, Suwon Hwaseong Fortress, Jinjuseong Fortress, Changdeokgung Palace, and Deoksugung Palace) may be used as video objects. As shown in FIG. 7, each of video objects 1 to 6 may include video capture location information (latitude and longitude) and tag information.

As shown in FIG. 8, Namdaemun may be selected as a reference target object to be classified. A server 200 of FIG. 2 may perform machine learning of an image 801 of the Namdaemun, which is the reference target object, and a video object and may extract a key point, video capture location information, and place tag information. In this case, the server 200 may use, but is not limited to, SURF OpenCV 2.4.10 which is an open source project to extract an image key point.

As a result of performing the machine learning of the image 801 of the Namdaemun and extracting the key point of the video object, as shown in FIG. 9, the server 200 may extract information about a similar key point (e.g., the number of key points). In this case, the information about the similar key point may include extracted time information.

Referring to FIG. 9 in which the extracted result is illustrated, it may be verified that the most key points (48 key points) are extracted from video objects 2, 3, and 6. Thus, the server 200 may cluster videos respectively corresponding to video object 2, video object 3, and video object 6 into a first video group.

The server 200 may verify video capture location information and place tag information of each of video objects 2, 3, and 6 clustered into the first video group. In this case, the server 200 may include Sungnyemun (another term referring to the Namdaemun) and the Namdaemun as place tag information and may cluster video object 2 having video capture information (e.g., GPS information) of the Namdaemun into a second video group for a reference target object.

According to various embodiments of the inventive concept, by the above-mentioned clustering operation, the server 200 may efficiently and accurately classify a plurality of videos depending on a specific criterion (e.g., a place) by extracting a key point, fusing video capture location information with place tag information, and clustering the plurality of videos.

According to various embodiments of the inventive concept, the server may efficiently and accurately classify a plurality of videos depending on a specific criterion (e.g., a place) by extracting a key point, fusing video capture location information with place tag information, and clustering the plurality of videos.

Furthermore, the server may perform a reliable clustering operation by selectively considering location information and tag information depending on a predetermined algorithm.

In addition, the server may effectively classify videos in a direction intended by both of a photographer and a searcher by extracting a video object in consideration of time when the video object is exposed on a real video when extracting the video object included in a video.

The term "module" or "unit" used in various embodiments may represent, for example, a unit including one or more combinations of hardware, software or firmware. The term "module" or "unit" may be interchangeably used with, for example, the terms "unit", "logic", "logical block", "component" and "circuit". The "module" or "unit" may be a minimum unit of an integrated component or may be a part thereof. The "module" may be a minimum unit for performing one or more functions or a part thereof. The "module" or "unit" may be implemented mechanically or electronically. For example, the "module" or "unit" according to various embodiments of the inventive concept may include at least one of an application-specific IC (ASIC) chip, a field-programmable gate array (FPGA), and a programmable-logic device for performing some operations, which are known or will be developed.

A module or a program module according to various embodiments of the inventive concept may include at least one or more of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

What is claimed is:

1. A hybrid-based image clustering method in a server, the method comprising:
   extracting a video object from each of a plurality of videos;
   calculating information about a similar key point between a predetermined reference target object and the extracted video object;
   clustering at least some of the plurality of videos into a first video group associated with the reference target object based on the information about the similar key point;
   clustering at least some of the videos included in the first video group into a second video group based on at least one of video capture location information and place tag information of the videos included in the first video group; and
   calculating each cluster variable for each of the plurality of videos based on at least one of the video capture location information and the place tag information,
   wherein the clustering into the second video group comprises:
   clustering the at least some of the videos included in the first video group into the second video group by first considering any one of the video capture location information and the place tag information based on the calculated cluster variable,
   wherein the calculating of the cluster variable comprises:
   calculating first reliability according to video capture location information associated with each of the plurality of videos;
   calculating second reliability according to place tag information of each of the plurality of videos; and
   calculating the cluster variable based on the first reliability and the second reliability, and
   wherein the first reliability is higher than the second reliability.

2. The method of claim 1, wherein, when there are a plurality of place tag information of each of the plurality of videos, the calculating of the second reliability comprises:
   verifying whether the place tag information is place tag information recorded by a photographer who captures the plurality of videos or place tag information recorded by a third party; and
   calculating the second reliability by applying a weight depending on the verified result,
   further comprising:
   when the place tag information is the place tag information recorded by the photographer, calculating the second reliability by applying a higher weight than that when the place tag information is the place tag information recorded by the third party.

3. The method of claim 1, wherein the extracting of the video object from each of the plurality of videos comprises:
   extracting an object exposed during the most time among a plurality of objects exposed on each of the plurality of videos as the video object.

4. A server for operating hybrid-based image clustering, the server comprising:
- a video object extracting unit configured to extract a video object from each of a plurality of videos;
- a reference target providing unit configured to learn a reference target object; and
- a clustering management unit configured to calculate information about a similar key point between the learned reference target object and the extracted video object, cluster at least some of the plurality of videos into a first video group associated with the reference target object based on the information about the similar key point, and cluster at least some of the videos included in the first video group into a second video group based on at least one of video capture location information and place tag information of the videos included in the first video group, wherein the clustering management unit is configured to:
calculate each cluster variable for each of the plurality of videos based on at least one of the video capture location information and the place tag information; and
cluster the at least some of the videos included in the first video group into the second video group by first considering any one of the video capture location information and the place tag information based on the calculated cluster variable, wherein the clustering management unit is configured to:
calculate first reliability according to video capture location information associated with each of the plurality of videos;
calculate second reliability according to place tag information of each of the plurality of videos; and
calculate the cluster variable based on the first reliability and the second reliability, and wherein the first reliability is higher than the second reliability.

5. The server of claim 4, wherein the clustering management unit is configured to:
when there are a plurality of place tag information of each of the plurality of videos, verify whether the place tag information is place tag information recorded by a photographer who captures the plurality of videos or place tag information recorded by a third party; and
calculate the second reliability by applying a weight depending on the verified result, and wherein the clustering management unit is configured to:
when the place tag information is the place tag information recorded by the photographer, calculate the second reliability by applying a higher weight than that when the place tag information is the place tag information recorded by the third party.

6. The server of claim 4, wherein the video object extracting unit is configured to:
extract an object exposed during the most time among a plurality of objects exposed on each of the plurality of videos as the video object.

* * * * *